July 22, 1969 A. LENDER 3,457,510

MODIFIED DUOBINARY DATA TRANSMISSION

Filed Feb. 18, 1966

INVENTOR.
ADAM LENDER

BY

Lippincott, Ralls & Hendricson
ATTORNEYS

United States Patent Office 3,457,510 Patented July 22, 1969

3,457,510

MODIFIED DUOBINARY DATA TRANSMISSION

Adam Lender, Palo Alto, Calif., assignor to Lenkurt Electric Co., Inc., San Carlos, Calif., a corporation of Delaware Filed Feb. 18, 1966, Ser. No. 528,484
Int. Cl. H04b 7/18, 7/00; H04l 15/00
U.S. Cl. 325—38 10 Claims

ABSTRACT OF THE DISCLOSURE

This invention provides method and apparatus for encoding a binary pulse train into a three level coded correlated signal by first transforming the train into a correlated two level signal and then conversion of such signal, as by filtering, to produce a three level waveform having both extreme levels representing one input binary signal level and intermediate level signal representing the other input binary signal level. The output is correlated in that a particular relationship exists between extreme level signals so that error detection is simplified, and there is provided twice the speed capability, in bits per second, of conventional binary systems employing the same bandwidth.

The present invention relates in general to a three-level correlative process and system for the electronic transmission of data, and more particularly to such a process system wherein transmitted signals have a small low-frequency content.

The widespread utilization of computers in data processing devices has created requirements for the transmission of large volumes of binary data over available communication channels. Although conventional binary transmission techniques are widely employed in such transmission, many modern applications in this field require greater speed capabilities than are available from binary transmission systems. There have consequently been developed multilevel systems generally following the principles set forth by Nyquist many years ago. Rather extensive investigation into multilevel techniques has produced a variety of sophisticated systems which, unfortunately, require complex equipment and commonly exhibit a poor error performance and higher sensitivity to noise than simple binary systems.

Multilevel coding is commonly characterized by an absence of correlation between the code levels. In this context, lack of "correlation" is taken to mean that in the coding process every possible combination of the group of $n$ binary digits is associated with one, and only one, particular level, regardless of the past history of the multilevel waveform and at the receiver this particular level is identified with the same specific group of binary digits. On the other hand, it is possible to utilize discrete signalling levels that are correlated in the process of generation, but which may be treated independently in the detection process. In contrast to multilevel systems, the level in a system with correlated levels represents only one binary digit, and correlation between the levels implies that in the coding process at the transmitter each MARK, for example, is associated with one of several predetermined levels, and the choice of a particular level depends upon the past history of the signal. It is still possible at the receiver for each level to be uniquely associated with a MARK or SPACE data bit without examining the past history of the waveform. Among the variety of advantages of this type of technique is the ability to detect errors without the necessity of introducing redundant digits into the input binary data at the transmitter. The foregoing was set forth in a publication by the inventor hereof, entitled "Correlative Digital Communication Techniques," appearing in IEEE Transactions on Communication Technology, vol. 13, June 1965, pp. 202–208.

In the development of level-coded correlative signal systems, a number of different approaches have been taken, and one of the most promising is commonly denominated as "duobinary." Duobinary systems are explained, for example, in an article appearing in IEEE Transactions on Communications and Electronics, vol. 82, May 1963, pp. 214–218, as well as a variety of other generally available publications. More specifically, the duobinary system is disclosed and claimed in U.S. Patent No. 3,238,299, entiled "High Speed Data Transmission System" by the present inventor. Subsequent publications by the present inventor have disclosed a number of variations in the basic duobinary concepts, and the present invention provides yet another alternative and improvement employing the duobinary technique or concept, as generally described in the above-noted articles, and the like. Reference is made to these prior publications and indentified patent application for a description of basic duobinary concepts and the advantages of the duobinary process and system.

The present invention is particularly directed to a level-coded correlative method and apparatus in which the spectrum shaping is such that zero frequency components are eliminated, and only a small amount of energy appears at low frequencies. This is accomplished with a two to one bandwidth compression relative to a straight binary system, and, furthermore employs only three levels. It is for this reason that the present invention is identified as a modified duobinary process and system.

Correlation in accordance with the present invention is made with the second bit back from any particular bit in question. General duobinary systems and techniques employ a correlation between a data bit and the previous bit; however, the present invention, as above stated, correlates any data bit with the second previous bit. The present invention furthermore provides for conversion of the encoded data by a filter having a predetermined bandwidth, so as to eliminate zero frequency components. It is well known that the ideal signalling rate of binary systems in bits per second is numerically equal to twice the frequency in cycles per second, representing the bandwith of a rectangular low pass filter. Since the bandwidth of this ideal filter is normally called $f_1$ cycles per second, the signalling rate would be $2f_1$ in bits per second. In practical systems a bandwidth equal to the signalling rate is required for binary systems. Thus the binary signalling rate in bits per second is equal numerically to the bandwidth in cycles per second. Hence for a bandwidth of $2f_1$ cycles per second the rate is $2f_1$ bits per second. For convenience the fundamental frequency $f_1$ cycles per second is used as a reference. It is particularly noted that the present invention provides a signalling rate of four times the bit-per-second frequency $f_1$ compared to twice the bit-per-second frequency of a binary system employing the same transmission bandwidth.

The present invention is illustrated as to the process and particular preferred embodiments of the system in the accompanying drawing, wherein.

The process of the present invention provides for encoding a binary data pulse train into a three-level coded correlative signal which has twice the speed capability in bits per second compared to conventional binary systems over the same bandwidth. This is accomplished by first transforming a binary pulse train into a correlated two-level signal. This two-level signal is then converted into a three-level waveform having a fixed pattern relationship. In the output waveform, extreme signal levels represent one input binary signal level and intermediate level signals represent the other input binary signal level.

Figure 1:
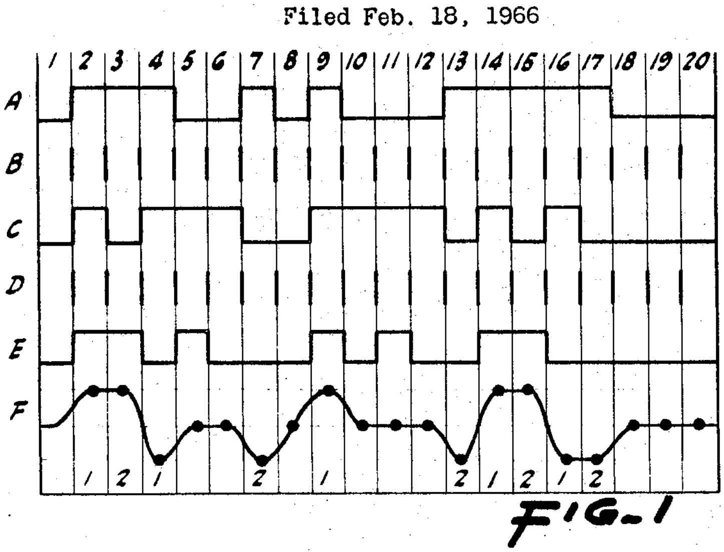
FIGURE 1 is an illustration of wave shapes as employed and produced by the present invention at successive stages of the process.

Considering now particular preferred steps of the process of the present invention and referring first to FIGURE 1 of the drawing, there is shown at A thereof, a typical input pulse train of binary nature, in which the upper level may designate a MARK and the lower level a SPACE. The light vertical lines in the figure delineate separate data bits, and it will be seen that the exemplary train A commences with a SPACE followed by three MARKS, etc. This input binary signal is combined with clock pulses, as illustrated at B in FIGURE 1, to produce the binary waveform illustrated at C. This waveform C results from changing the state or level of the signal for each coincidence of a clock pulse and an upper level of the input signal A. The process hereof further comprises the combination of the signal C, with a further succession of clock pulses, as indicated at D, to produce the waveform illustrated at E. The waveform E is produced in the same manner as described above for waveform C, i.e., by changing level for each coincidence of clock pulse and an upper level of waveform C. This resultant pulse train E is converted into a three-level waveform by filtering to pass frequencies in a predetermined bandwidth. The result of this filtering is the waveform F, which is suitable for transmission through conventional communication channels and which carries the intelligence of the original input binary wave A. The correlation property of the waveform at E is such that every bit depends not upon the previous digit, but upon the second digit back. For example, the first and third bits at E are, respectively, 0 and 1, and thus have an odd number of binary 1's. Following the predetermined rules this corresponds to a MARK, or binary 1 condition in waveform A at bit number 3. Next, the second and fourth bits at E also have an odd number of binary 1's and correspond to a MARK at A at bit number 4. But the third and fifth bits at E have an even number of 1's and, therefore, correspond to a SPACE at A at bit number 5. Similarly, for bits 6 and 8 of waveform E, both are 0's and, therefore, the number of 1's is considered an even number. This corresponds to SPACE, or binary 0, in the waveform A in bit number 8.

Considering the wave F, it will be seen that extreme levels thereof represent or correspond to the upper level or MARK condition of input binary waveform A. The intermediate, middle or center level of waveform F represents the lower level or SPACE condition of binary input A. It is also to be noted that the modified duobinary signal F follows a predetermined set of rules. These rules may be readily realized by grouping all of the successive MARKS in pairs and assigning the pair number to each MARK, as illustrated in FIGURE 1. Successive MARKS are indicated by the numerals 1 and 2, with a repetition of this numbering for the next pair of MARKS. A MARK bearing number 1 in a pair of two successive MARKS, will be seen to always have the opposite polarity relative to the previous MARK which, of course, carries the number 2. The polarity of the MARK identified by number 2, relative to the previous MARK bearing number 1, is governed by a set of odd and even rules, as in the straight duobinary system and method. More specifically, if the number of intervening SPACES between a pair of MARKS numbered 1 and 2 is even, then the polarities of these MARKS are the same. If the number of intervening spaces between a pair of MARKS numbered 1 and 2 is odd, then the polarities of these two MARKS are opposite. The correlation properties of the waveform F produced in accordance with the present invention, permits the ready detection of errors in received and transmitted data. Errors in received data may arise from a variety of circumstances, such as transmission impairments or random noise, which changes a MARK to a SPACE, or vice versa. Error detection involves the production of some type of indication, such as a pulse at the receiver, that an error or errors has occurred, but does not identify the time location of such error. If the time location of the error is known, then error correction can be accomplished, inasmuch as only binary values are involved. Conventional data transmission systems employ redundant binary digits inserted into their binary data stream at the input, in order to provide for the detection of errors at the receiver. One of the major advantages of level-coded process and systems is that redundant digits are not required. It will be realized that the insertion of additional digits in any binary pulse train reduces the amount of data that can be transmitted over any particular system.

Figure 2:
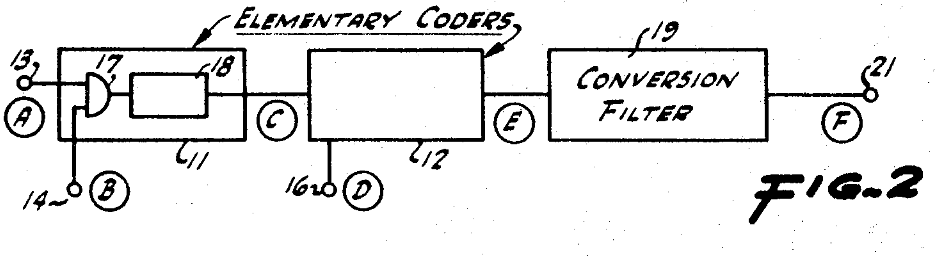
FIGURE 2 is a block diagram of one system for carrying out the present invention.

The systems of the present invention are relatively simple, and the above-noted level-coded wave, such as illustrated at F, may be produced in a variety of ways with no more complexity in the system than is normally found in ordinary binary systems. Referring to FIGURE 2, there is shown a system for producing the modified duobinary wave of the present invention. First and second elementary coders 11 and 12 are shown connected in series with an input terminal 13 adapted to receive input signals such as the binary pulse train A of FIGURE 1. These elementary coders 11 and 12 are alike, and each is provided with identical clock pulses from terminals 14 and 16 respectively. The coder 11 includes an AND circuit 17 having inputs from the input terminal 13 and clock pulse terminal 14. The output of this AND circuit is connected to a flip-flop circuit 18 which thereby produces at the output thereof the waveform C, as illustrated in FIGURE 1. It will be noted that for convenience, the illustration of FIGURE 2 contains reference to the waveforms of FIGURE 1 at appropriate portions of the circuitry, as an indication of the existence of these waveforms at such locations. The waveform C, applied to the second coder 12 is operated upon in the same manner as described above in connection with coder 11, so that the output of this second elementary coder 12 comprises the waveform E, as indicated. A conversion filter 19 is connected between the output of the coder 12 and an output terminal 21, whereat the final waveform F appears for transmission.

Figure 3:
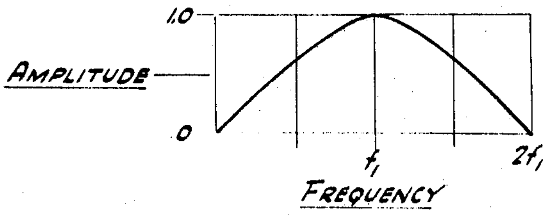
FIGURE 3 is a graph illustrating characteristics of filtering employed in the present invention.

The conversion filter 19 comprises a bandpass filter having zero transmission at zero frequency and at a fresuency of $2f_1$ cycles per second. Maximum transmission occurs at the frequency of $f_1$ cycles per second. Typical characteristics of this filter are shown in FIGURE 3. Such characteristics are usually a practical network approximation of the relationships $H(f)=\sin \pi f/2f_1$ for $0\leq f\leq 2f_1$ and 0 elsewhere. The conversion of the wave form E to waveform F in filter 19 is accompanlished by limiting the bandwidth of the filter to a frequency that is numerically equal to one-half the bit rate, or $2f_1$ cycles per second. Zero frequency components are thus substantially entirely eliminated, and energy of the output wave is centered at this frequency $f_1$. It is particularly noted again that the signalling rate is four $f_1$ bits per second compared to two $f_1$ bits per second for an ideal binary system having the same bandwidth. The output waveform F will be seen to have a one-to-one correspondence of each sampling point with the original data waveform A, and this is emphasized for clarity by the heavy dots applied to the waveform F. The above equation for the filter characteristics may also be written as $H(\omega)=\frac{1}{2}|1-e^{-j2\omega T}|$ for $0\leq\omega\leq\pi/T$, where $\omega$ is frequency in radians per second and T is the bit duration in seconds. The term $-e^{-j2\omega T}$ delays the input waveform by 2T seconds, or in this case by two digit or bit intervals. It will thus be seen from this relationship that an input waveform is delayed a time 2T and subtracted from itself in passing through the filter. This is shown in the waveform of F of FIGURE 1 wherein the wave is also shown to be shaped and smoothed because of filter bandwidth limitations. The output wave has three levels, as in duobinary systems, and consequently the approximate noise penalty relative to the binary system is about the same for duobinary systems. It is, however, to be appreciated that the modified duobinary signal of the present invention allows transitions between all three levels thereof, i.e., the transition between extreme levels, for example. This does produce some irreducible intersymbol interferences, as in multilevel systems. However, the advantages of the modified duobinary signal of this invention are sufficient for many applications to dictate its use over duobinary.

Figure 4:
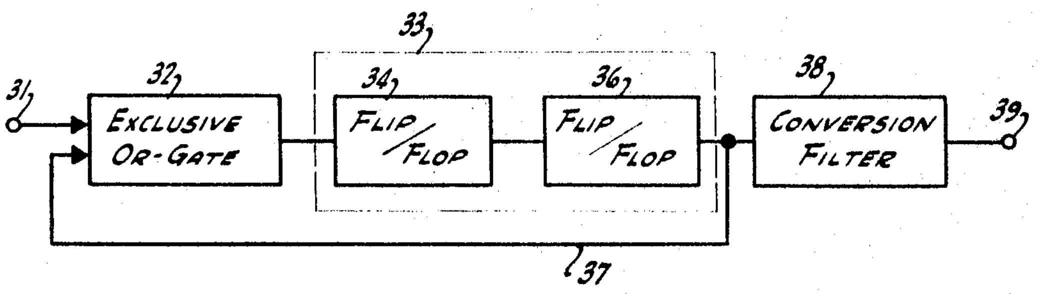
FIGURE 4 is a block diagram of an alternative system in accordance with the present invention.

There is illustrated in FIGURE 4 an alternative circuit for carrying out the method of the present invention. As shown in FIGURE 4 an input terminal 31 applies input data signals to an exclusive OR gate 32, which has the output thereof connected to the input of a two-stage shift register 33. This shift register may be comprised of a pair of serially-connected flip-flop circuits 34 and 36, as indicated. The output of the two-stage shift register is fed back through a return line 37 to the other input of the OR gate 32. The output of the shift register is also applied to the input of a conversion filter 38 corresponding to the filter 19 of FIGURE 2, and the output of the filter comprising the waveform F is applied to an output or transmission terminal 39. The operation of exclusive OR gates is well known, as is the operation of shift registers. The exclusive OR gate produces a zero if an even number of ones is applied to the input to the gate, and a one if an odd number of ones is applied to the gate. This may be otherwise stated by considering the possible inputs to the OR gate and the results thereof as indicated in the following list:

$$0+0=0$$
$$1+0=1$$
$$0+1=1$$
$$1+1=0$$

The system of FIGURE 4 produces the same results as the system of FIGURE 2, although under the majority of circumstances, the system illustrated in FIGURE 2 is preferable.

It will be seen from the foregoing that the present invention provides a modified duobinary process and apparatus or system producing level-coded signals from binary inputs wherein the level sequence is correlated in a particular manner. The output signal of the present invention provides a two-to-one bandwidth compression, and comprises a three-level wave admitting of changes between any level thereof, but containing readily decodable information comprising the binary input. Reference is made to prior publications and patent applications of the present inventor for decoding of duobinary signals, and it is noted that same are generally applicable hereto, inasmuch as extreme levels indicate either MARK or SPACE, and center levels indicate the alternative. Decoding may, for example, be accomplished by utilization of slicers. It is, of course, possible to invert during encoding, to thus choose whether the extreme levels, for example, are representative of MARK or SPACE. The location and distribution of the energy spectrum herein is particularly emphasized for the present invention centers the energy spectrum about a chosen frequency, as stated above, and eliminates zero frequency components while substantially minimizing low-frequency components.

The present invention has been described above with reference to particular preferred steps of the process and embodiments of the system; however, it is not intended to limit the invention by the terms of the disclosure or details of the illustrations. Reference is made to the appended claims for a delineation of the true scope of the invention.

What is claimed is:

1. Data processing including encoding binary data pulse trains containing first and second signal levels comprising the steps of transforming the binary signals into a transformed two signal-level pulse train of altered characteristics and having each bit correlated with the second preceding bit, and converting said transformed pulse train into a three signal-level waveform having extreme levels representing a first signal level of said binary pulse train and a center signal level representing the second signal level of said binary pulse train and correlating the sequence of signal levels of said three signal-level waveform to establish a fixed pattern relationship between pairs of extreme level signals.

2. The process of claim 1, further characterized by converting the transformed pulse train into said three signal-level waveform by filtering the pulse train to pass a limited band of frequencies excluding zero frequency.

3. The process of claim 2 further defined by limiting the frequency band of filtered signals to a frequency that is numerically equal to one-half the bit rate of the binary pulse train centered at a frequency numerically equal to one quarter of the bit rate of said binary pulse train.

4. The process of claim 1, further defined by said correlation comprising pairing successive extreme level signals, with the first signal of each pair having the opposite polarity from the second signal of the preceding pair, and the second signal of the pair having the same polarity as the first signal of the pair when an even number of bit spaces intervene and the opposite polarity when an odd number of bit spaces intervene.

5. The process of claim 1, further characterized by transforming and correlating by combining the binary data pulse train with in-phase clock pulses of the same bit rate and complementing the combination to produce an intermediate pulse train, and combining said intermediate pulse train with the same clock pulses and complementing the combination to produce said transformed pulse train.

6. A modified duobinary data system comprising an input terminal adapted to receive a binary pulse train having a predetermined bit rate, coding circuitry connected to said input terminal and including means twice transforming said binary pulse train to produce a two level signal correlated with the second preceding signal, and a bandpass filter having an input connected to the output of said coding circuitry and having a passband of frequencies that is substantially numerically equal to one-half the bit rate of the input binary pulse train to produce at an output thereof a signal train having three levels with the extreme levels representing one binary level and a center level representing the other binary level.

7. A system as set forth in claim 6, further defined by said filter having the passband centered at a frequency substantially numerically equal to one-quarter of said bit rate to eliminate zero frequency signals and minimize low-frequency signals at said filter output.

8. A system as set forth in claim 6, further defined by said coding circuitry comprising a pair of serially-connected elementary coders with each including an AND circuit having one input connected to the coder input and a clock pulse terminal connected to the other input, and a flip-flop circuit connected between the output of the AND circuit and the output of the coder.

9. A system as set forth in claim 8, further characterized by said filter having the passband centered at a frequency substantially numerically equal to one-quarter of said bit rate.

10. A system as set forth in claim 6, further defined by said coding circuitry comprising an exclusive OR gate having an input connected to the circuit input terminal, a two-stage shift register connected between the output of said exclusive OR gate and said filter, and a return line connected between the output of said shift register and the other input of said exclusive OR gate.

References Cited

UNITED STATES PATENTS

| | | | |
|---|---|---|---|
| 3,337,864 | 8/1967 | Lender | 325—38 |
| 3,388,330 | 6/1968 | Kretzmer | 325—42 |

ROBERT L. GRIFFIN, Primary Examiner

J. A. BRODSKY, Assistant Examiner

U.S. Cl. X.R.

178—68; 325—41